J. W. BELLAIRS.
VELOCIPEDE.
APPLICATION FILED NOV. 18, 1915.
1,190,089.
Patented July 4, 1916.
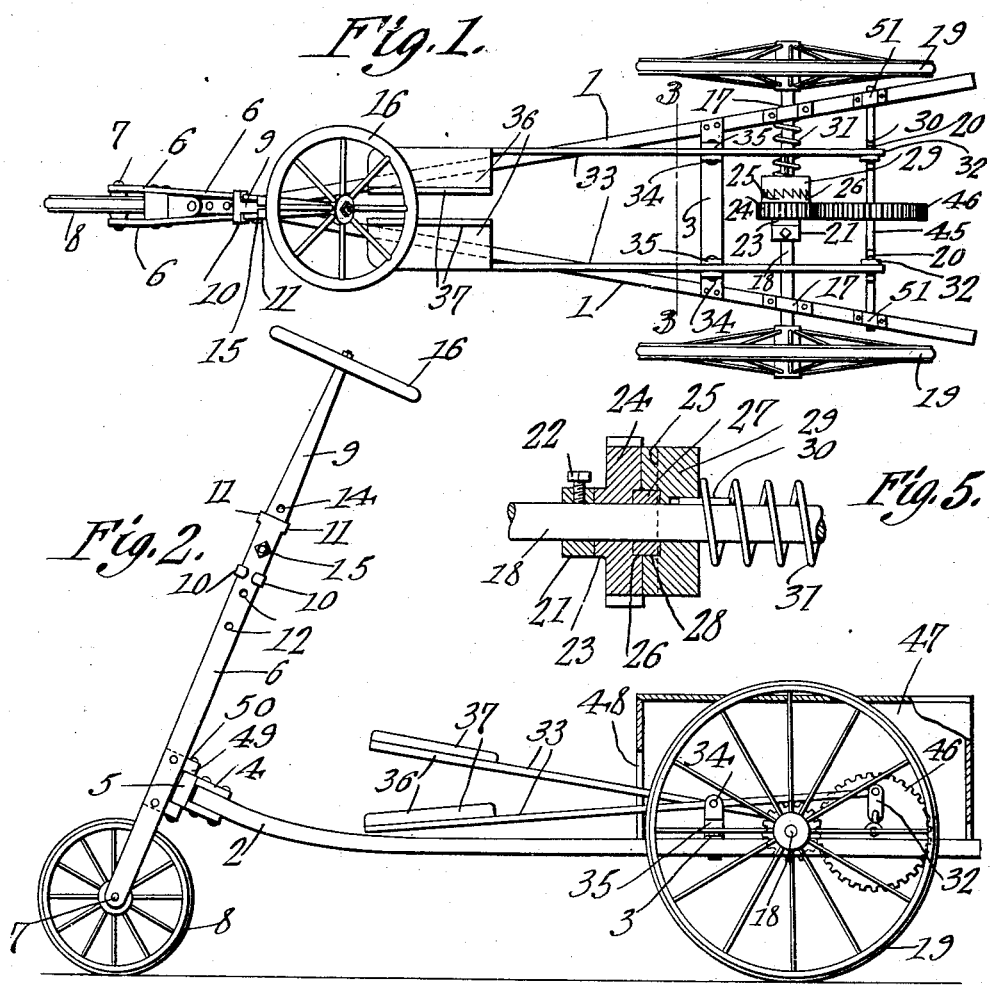
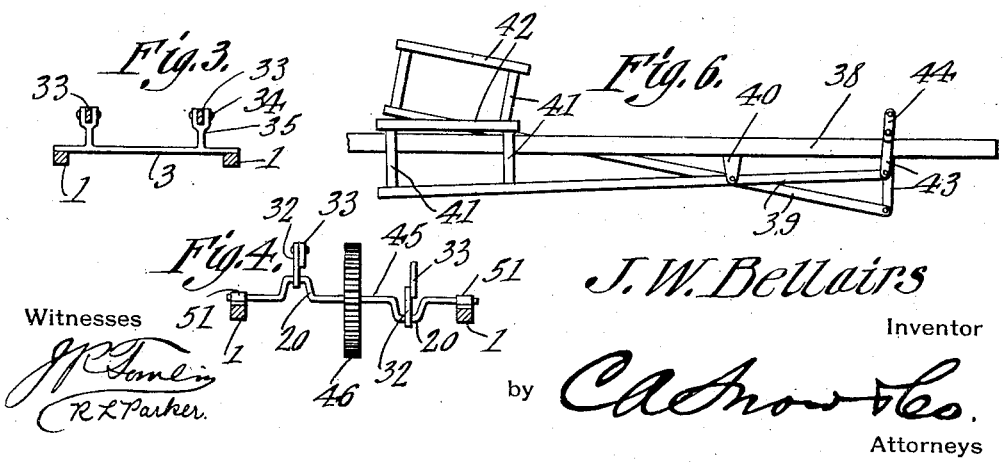
J. W. Bellairs
Inventor
Witnesses
by C. A. Snow & Co.
Attorneys

UNITED STATES PATENT OFFICE.

JOHN WILLIAM BELLAIRS, OF MISHAWAKA, INDIANA.

VELOCIPEDE.

1,190,089.  Specification of Letters Patent.  Patented July 4, 1916.

Application filed November 18, 1915. Serial No. 62,180.

*To all whom it may concern:*

Be it known that I, JOHN W. BELLAIRS, a citizen of the United States, residing at Mishawaka, in the county of St. Joseph and State of Indiana, have invented a new and useful Velocipede, of which the following is a specification.

The invention aims primarily to provide a velocipede so constructed that the operator may stand upon operating levers while steering, to the end that the entire weight of the operator may be made effective to actuate the levers.

Another object of the invention is to improve the driving mechanism.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 is a top plan, the casing or seat being omitted; Fig. 2 is a side elevation; Fig. 3 is a cross section taken approximately on the line 3—3 of Fig. 1, distant parts being omitted; Fig. 4 is a cross section showing the auxiliary shaft and parts carried thereby; Fig. 5 is a transverse section taken through the clutch mechanism; Fig. 6 is a fragmental side elevation showing a modified form of the invention.

In carrying out the present invention there is provided a supporting structure embodying a pair of forwardly converging side bars 1 which may be upturned slightly at their forward ends as shown at 2. The forward ends 2 of the side bars 1 are assembled with a bracket 4 embodying a socket 5, the bars 1 being connected intermediate their ends by a cross brace 3.

The invention comprises a front fork made up of side strips 6 carrying an axle 7 supporting a rotatable front wheel 8. Brackets 49 projecting rearwardly from the fork forming strips 6, and through the brackets 49 and the socket 5 is passed a pivot pin 50, the construction being such that the fork composed of the strips 6 may be turned laterally, to effect a steering of the vehicle. Extended between the strips 6 of the fork at the upper ends thereof is a rod 9 provided with fingers 10 which engage the front and rear edges of the strips 6 slidably, the strips 6 being provided at their upper ends with fingers 11 which engage the front and rear edges of the rod 9 slidably. In the strips 6 are fashioned a plurality of openings 12, there being a plurality of openings 14 in the rod 9. The openings 12 and 14 may be alined to receive the securing element such as a bolt 15. Carried by the upper end of the rod 9 is a steering member of any desired sort preferably in the form of a wheel 16. The coöperation between the parts 6 and 9 is such that the wheel 16 may be disposed at any desired height above the supporting structure comprising the side bars 1.

Mounted on the side bars 1 are bearings 17 in which is journaled for rotation a main shaft 18, to the ends of which are secured ground wheels 19. Surrounding the main shaft 18 and secured thereto by means of a set screw 22 is a collar 21 constituting an abutment for the hub 23 of a pinion 24 mounted to rotate on the main shaft 18 but adapted to be connected thereto by a mechanism which will be described hereinafter. A clutch member 25 constitutes a part of the pinion 24 and is provided in its inner face with a recess 26 receiving a resilient member 27, preferably a block of rubber, the resilient block 27 being received in a recess 28 formed in a clutch member 29 splined as shown at 30 to the shaft 18 to slide therealong but connected to the shaft 18 for rotation therewith. A spring 31 abuts against the outer face of the clutch member 29 and against one of the side bars 1, the function of the spring being to maintain the clutch members 29 and 25 in operative engagement.

Mounted on the side bars 1 and disposed to the rear of the bearings 17 are bearings 51 in which is journaled for rotation an auxiliary shaft 45 provided with cranks 20. Assembled with the cranks 20 are upwardly extended pitmen 32, pivoted to the rear ends of levers 33 fulcrumed as shown at 34 on standards 35 carried by the cross bar 3. At their forward ends, the levers 33 are equipped with treadles 36, the inner edges of which are provided with upstanding guards 37 adapted to prevent the feet of the operator from sliding off the treadles. Secured to the auxiliary shaft 45 is a gear wheel 46 which meshes into the pinion 24. If desired, a casing 47 may be mounted on the side bars 1, the casing serving to house most of the driving mechanisms and serving, if desired, as a seat. The forward end of the casing 47 is provided with an opening 48 through which the levers 33 work.

In Fig. 6 of the drawings, a slight modification of the invention is shown. In Fig. 6, the numeral 38 denotes the side bars of the main supporting frame, the levers being shown at 39 and being supported on hangers 40 which extend downwardly from the brace 3, instead of extending upwardly therefrom, as shown at 35 in Fig. 3. The forward ends of the levers 39 carry upstanding posts 41 supporting treadles 42. Pivoted to the rear ends of the levers 39 are pitmen 43, operatively connected with a crank shaft 44 journaled for rotation on the side bars 38 and corresponding to the auxiliary shaft 45. The modification shown in Fig. 6 consists, essentially, in the fact that the levers 39 are disposed below the supporting frame made up of the side bars 38. The levers 33 are long enough so that they extend to a point below or near to the steering wheel 16. Consequently, the operator may stand in an erect position on the treadles 36 and actuate the levers 33, the entire weight of the operator being made effective in driving the vehicle. When the levers 33 are manipulated in the manner hereinbefore mentioned, the levers swing on their fulcrums 34, the pitmen 32 are actuated, the shaft 45 being rotated through the instrumentality of the cranks 20. When the shaft 45 is rotated, the gear wheel 46 is rotated also, the gear wheel 46 meshing into the pinion 24, and the latter being operatively connected with the main shaft 18 through the instrumentality of the clutch members 26 and 29, the latter clutch member being splined to the shaft 18, as indicated at 30. When the shaft 18 is rotated, the wheels 19 will be rotated also, the vehicle being advanced. When the operator ceases to work the levers 33, the gear wheel 46 and the pinion 24 remain at rest, the shaft 18 and the ground wheels 19 continuing to rotate, the clutch member 29 clicking over the clutch member 25. Especial attention is directed to the resilient block 27 which is interposed between the clutch members 25 and 29. Owing to the presence of this block, which acts as a cushion, the clutch members 25 and 29 will operate noiselessly as the clutch member 29 is thrust toward the clutch member 25 by the action of the spring 31 when the shaft 18 and the ground wheels 19 rotate independently of the pinion 24.

Having thus described the invention, what is claimed is:—

In a velocipede, a frame; a ground wheel; a shaft journaled on the frame and provided with a crank; means for connecting the shaft with the ground wheel; a bracket upstanding from the frame; a lever fulcrumed intermediate its ends on the bracket; means for connecting the rear end of the lever with the crank; a steering wheel; and a steering shaft journaled on the frame and connected with the steering wheel, the lever being forwardly extended to a point adjacent the steering shaft, whereby an operator may stand upon the forward end of the lever while the steering shaft is being manipulated, the frame lying beneath the forward end of the lever to limit the downward movement thereof should the connecting means between the rear end of the lever and the crank break, the fulcruming of the lever intermediate its ends on the bracket serving to decrease the vertical throw of the lever at its forward end.

In testimony that I claim the foregoing as my own, I have hereto affixed my signature in the presence of witnesses.

JOHN WILLIAM BELLAIRS.

Witnesses:
D. M. HALL,
JOHN H. BULTINCK,
H. J. STEKETEE.